United States Patent
Nakayama et al.

(10) Patent No.: US 6,837,825 B2
(45) Date of Patent: Jan. 4, 2005

(54) SHIFT CONTROLLING APPARATUS AND SHIFT CONTROLLING METHOD FOR CONTINUOUSLY VARIABLE TRANSMISSION

(75) Inventors: Jun Nakayama, Tokyo (JP); Masayuki Nishida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/374,052

(22) Filed: Feb. 27, 2003

(65) Prior Publication Data

US 2003/0162633 A1 Aug. 28, 2003

(30) Foreign Application Priority Data

Feb. 28, 2002 (JP) ...................................... P. 2002-053109

(51) Int. Cl.[7] .............................................. B60K 41/12
(52) U.S. Cl. ......................................................... 477/48
(58) Field of Search ...................................... 477/48, 46

(56) References Cited

U.S. PATENT DOCUMENTS

| | | | | |
|---|---|---|---|---|
| 2,962,142 A | * | 11/1960 | Straub ........................ | 192/84.2 |
| 4,735,113 A | * | 4/1988 | Yamamuro et al. ........... | 477/38 |
| 4,976,170 A | * | 12/1990 | Hayashi et al. ............... | 477/43 |
| 5,022,285 A | * | 6/1991 | Suzuki ........................ | 477/48 |
| 5,413,540 A | * | 5/1995 | Streib et al. ................... | 477/43 |
| 5,514,046 A | * | 5/1996 | Petersmann et al. .......... | 477/39 |
| 6,019,701 A | * | 2/2000 | Mori et al. .................... | 477/46 |
| 6,244,986 B1 | * | 6/2001 | Mori et al. .................... | 477/46 |
| 6,551,209 B2 | * | 4/2003 | Cheadle et al. ............. | 475/150 |
| 2002/0019284 A1 | * | 2/2002 | Aikawa et al. ............. | 475/150 |
| 2002/0155913 A1 | * | 10/2002 | Fusegi et al. ............... | 475/150 |

FOREIGN PATENT DOCUMENTS

| | | |
|---|---|---|
| JP | 05-54574 | 8/1993 |
| JP | 05-332426 | 12/1993 |

* cited by examiner

Primary Examiner—Dirk Wright
(74) Attorney, Agent, or Firm—Smith, Gambrell & Russell, LLP

(57) ABSTRACT

A shift controlling apparatus for a continuously variable transmission changing of an input side rotational element driven by an engine via a power transmitting element to an output side rotational element, has, a rapid acceleration determination unit for determining whether or not a rapid acceleration demanding condition according to the depressed amount of an accelerator pedal, basic shift mode setting unit for setting a rotating speed of the input side rotational element based on a basic shift mode according to operating conditions such as throttle opening, vehicle speed and engine speed, accelerating shift mode setting unit for increasing the vehicle speed based on an accelerating shift mode correspondingly to an increase in engine speed, and a control unit for switching from the basic shift mode to the accelerating shift mode when the rapid acceleration determination unit determines that a rapid acceleration demanding condition occurs.

16 Claims, 5 Drawing Sheets

SHIFT CONTROLLING APPARATUS AND SHIFT CONTROLLING METHOD FOR CONTINUOUSLY VARIABLE TRANSMISSION

BACKGROUND OF THE INVENTION

1. Field of the Invention

The present invention relates to a shift controlling apparatus for a continuously variable transmission for controlling a speed ratio thereof according to operating conditions of a vehicle, particularly to the shift control apparatus for improving a running feeling when the vehicle is rapidly increased.

2. Description of the Related Art

There are belt-type and toroidal-type continuously variable transmissions for vehicles. The belt-type continuously variable transmission has a primary pulley on an input shaft, a secondary pulley on an output shaft and a power transmission element such as a belt provided so as to wind on the pulleys. Speed ratios change continuously by changing widths of the pulleys.

As a kind of shift control apparatuses for the continuously variable transmission like this, there is the shift control apparatus having a memory in which a basic shift characteristics map is stored for setting a target speed for the primary pulley based on parameters such as a throttle opening, a vehicle speed and an engine speed which represent operating conditions of a vehicle while referencing the basic shift characteristics map and implementing a follow-up control such that an actual primary pulley speed converges to the target speed. Then, the speed ratio is controlled continuously from low to overdrive. Consequently, while the vehicle runs at a constant speed, when a driver operates to accelerate the vehicle rapidly or a kickdown shift is brought about, conventionally, the transmission is controlled by shift characteristics set in advance via the throttle opening, the vehicle speed and the engine speed. Then, the engine speed is drastically increased to a target speed of the primary pulley while the speed ratio setting is increased to the low side, and thereafter the speed ratio is gradually lowered. Accordingly, the engine speed increases before an increase in a vehicle speed at the time of rapid acceleration, and the vehicle speed increases thereafter, this sometimes gives the driver an uneasy feeling. In particular, in many cases ordinary continuously variable transmissions are provided with a shift characteristic in which the engine speed is held as low as possible while the vehicle is running at a constant speed to have an increased fuel economy, this serving to increase an uncomfortable feeling by the driver when the engine speed is increased from low to high by a rapid acceleration.

In contrast, in case a shift control is implemented in which the target speed for the primary pulley is set to increase in accordance with the increase in the engine speed, uncomfortable feeling at the time of a rapid acceleration can be eliminated, but this results in use of higher engine speed than required engine speed while the vehicle is running at a constant speed, and hence it becomes difficult to use an engine speed range which can provide a good fuel economy. On the other hand, JP-A-5-332426 discloses the continuously variable transmission in which the vehicle speed increases while repeating gradual increase and rapid decrease in the engine speed at the time of the rapid acceleration.

SUMMARY OF THE INVENTION

An object of the present invention is to improve a running feeling when the vehicle is rapidly increased by the driver.

Another object of the present invention is to increase fuel economy by permitting the engine speed to be set low when an acceleration condition initiated by the driver.

With a view to attaining the objects, according to an aspect of the present invention, there is provided a shift controlling apparatus for a continuously variable transmission for continuously changing a rotation of an input side rotational element driven by an engine via a power transmission element for transmitting thereof to an output side rotational element, having an acceleration determination unit for determining whether or not a rapid acceleration demanding condition exists according to an accelerator pedal, a basic shift mode setting unit for setting a rotational speed of the input side element based on a basic shift mode according to operating conditions such as a throttle opening, a vehicle speed and an engine speed, an accelerating shift mode setting unit for increasing the vehicle speed based on an accelerating shift mode corresponding to an increase in the engine speed, and a control unit for switching from the basic shift mode to the accelerating shift mode when the rapid acceleration determination unit determines a rapid acceleration demanding condition.

According to another aspect of the present invention, switching means for changing the accelerating shift mode to the basic shift mode is implemented when the rapid acceleration determination unit determines that the rapid acceleration demand is cancelled.

With the present invention, since the speed ratio of the continuously variable transmission is held at a constant or substantially constant value when the vehicle is rapidly accelerated, the vehicle speed increases with the increase in engine speed, thereby making it possible to improve an acceleration feeling. In addition, when the accelerating condition ends, since a normal running condition is restored by smoothly switching the accelerating mode back to the basic shift mode, fuel consumption can be improved. In addition, an optimum engine braking force can be obtained by holding the speed ratio at the constant or substantially constant value when the accelerating mode is switched back to the basic shift mode.

According to a further aspect of the present invention, there is provided the shift control apparatus for the continuously variable transmission, when switching from the basic shift mode to the accelerating shift mode, the rotational speed of the input side rotational element is moderately increased by restricting the degree of an increase in a speed after the speed of the input side rotational element is increased to a predetermined value according to the running conditions of a vehicle. In addition, according to the other aspect of the present invention, there is provided a shift control apparatus for the continuously variable transmission, when switching from the accelerating shift mode to the basic shift mode, the rotational speed of the input side rotational element is moderately decreased by restricting a degree of a decrease in the speed after the speed of the input side rotational element is decreased to the predetermined value according to the running conditions of the vehicle.

By smoothly switching from the basic shift mode to the accelerating shift mode and smoothly switching from the accelerating shift mode to the basic shift mode, it is possible to improve the shift feeling.

According to a further aspect of the present invention, there is provided the shift control apparatus for the continuously variable transmission, when switching from the basic shift mode to the accelerating shift mode, the rotational speed of the input side rotational element is moderately increased by restricting the degree of an increase in a speed after the speed of the input side rotational element is increased to a predetermined value according to the running conditions of a vehicle. In addition, according to another aspect of the present invention, there is provided a shift control apparatus for the continuously variable transmission, when switching from the accelerating shift mode to the basic shift mode, the rotational speed of the input side rotational element is moderately decreased by restricting a degree of a decrease in the speed after the speed of the input side rotational element is decreased to the predetermined value according to the running conditions of the vehicle.

Furthermore, according to another aspect of the present invention, there is provided the shift control apparatus for the continuously variable transmission wherein a target speed ratio in the accelerating shift mode is larger than a speed ratio due to a throttle opening in the basic shift mode and an increase of the vehicle speed beyond a predetermined throttle opening characteristics curve in the basic shift mode while following the engine speed. Additionally, according to another aspect of the present invention, there is provided the shift control apparatus for the continuously variable transmission wherein the basic shift mode has shift characteristics in which the target speed of the input side rotational element relative to the vehicle speed is set with respect to each throttle opening, whereby the engine speed is set low while running in the basic shift mode.

According to the present invention, it is preferable that a shift controlling method for a continuously variable transmission for changing a rotation of an input side rotational element driven by an engine via a power transmission element to an output side rotational element, has steps of determining whether or not a rapid acceleration demanding condition exists according to a depressed amount of an accelerator pedal; setting a rotating speed of the input side rotational element based on a basic shift mode according to operating conditions; increasing the vehicle speed based on an accelerating shift mode correspondingly to an increase in an engine speed, and switching from the basic shift mode to the accelerating shift mode when the rapid acceleration determining step determines that a rapid acceleration demanding condition is decided.

In this case, it is preferable that switching from the accelerating shift mode to the basic shift mode is implemented when the rapid acceleration determining step determines that the rapid acceleration demand is cancelled.

In this case, it is preferable that the shift controlling method further has step of: implementing that the rotational speed of the input side rotational element is moderately increased by restricting the degree of increase in the rotating speed after the rotating speed of the input side rotational element is increased to a predetermined value according to the running conditions of a vehicle when switching from the basic shift mode to the accelerating shift mode.

In this case, it is preferable that the shift controlling method further has step of implementing that the rotational speed of the input side rotational element is moderately decreased by restricting the degree of decrease in the rotating speed after the rotating speed of the input side rotational element is decreased to a predetermined value according to the running conditions of the vehicle when switching from the accelerating shift mode to the basic shift mode.

For this embodiment, it is preferable that the implementing step is performed according to the running conditions of the throttle opening and the vehicle speed.

In this case, it is preferable that the implementing step is performed when at least either one of the rotating speed of the input side rotational element and the vehicle speed reaches or exceeds a predetermined value, whereas the implementing step is unexecuted at the low engine and vehicle speeds.

In this case, it is preferable that a target speed ratio in the accelerating shift mode is larger than a speed ratio corresponding to the throttle opening degree in the basic shift mode and the vehicle speed is increased beyond a throttle opening characteristics curve in the basic shift mode while following the engine speed.

In this case, it is preferable that the basic shift mode has shift characteristics in which the target rotating speed of the input side rotational element relative to the vehicle speed is set with respect to each throttle opening, whereby the engine speed is set at a low value while running in the basic shift mode.

DETAILED DESCRIPTION OF THE PREFERRED EMBODIMENT

Figure 1:
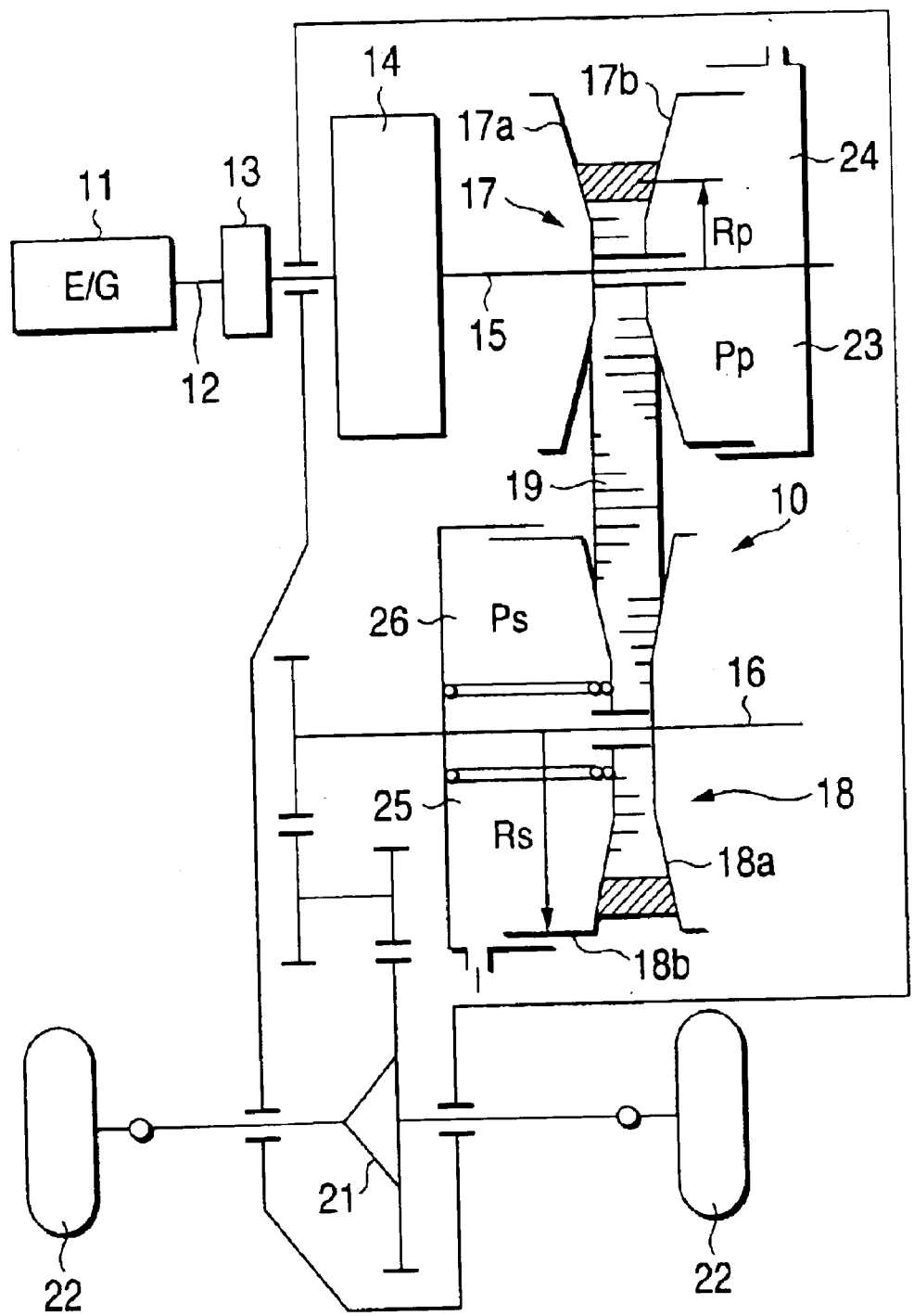
FIG. 1 is a schematic diagram showing a drive system for a vehicle provided with a continuously variable transmission.

An embodiment of the present invention will be described in detail below with reference to the accompanying drawings. FIG. 1 is a schematic diagram showing a drive system of a vehicle provided with a continuously variable transmission. The continuously variable transmission 10 has a primary shaft 15 to which the a crank shaft 12 driven by an engine 11 is transmitted via a starting apparatus 13, a torque converter and a forward and reverse changeover apparatus 14 and a secondary shaft 16 which is in parallel with the primary shaft 15.

A primary pulley 17 as an input side rotational element is provided on the primary shaft 15. This primary pulley 17 has a primary fixed pulley 17a found in the primary shaft 15 and a primary slidable half pulley 17b attached to the primary shaft 15 so as to face the primary slidable half pulley 17a and slide on the shaft 15 in an axial direction via a ball spline. A gap between coned surfaces of the half pulleys or a width of a groove in the primary pulley is variable. A secondary pulley 18 is provided on the secondary shaft 16, and the secondary pulley 18 has a secondary fixed half pulley 18a found in the secondary shaft 16 and a secondary sliding half pulley 18b attached to the secondary shaft 16 so as to face the primary fixed half pulley 18a and to slide on the same shaft 16 in the axial direction in a similar way to the primary sliding half pulley 17b. The width of the groove in the secondary pulley is variable.

A belt 19 is wound between the primary pulley 17 and the secondary pulley 18. The rotation of the primary pulley 15 is continuously changed by changing the groove widths of both the pulleys 17, 18 to thereby change the ratios of contact diameters of the belt 19 relative to the respective pulleys. When it is defined that the contact diameter of the belt 19 relative to the primary pulley 17 is Rp and the contact diameter of the same relative to the secondary pulley 18 is Rs, a speed ratio or a pulley ratio "i" becomes i=Rs/Rp. The rotation of the secondary shaft 16 is transmitted to drive wheels 22 via a gear train having reduction gears and a differential 21, and in the case of front drive, drive wheels 22 are front wheels.

In order to change the groove width of the primary pulley 17, a primary cylinder 23 is provided on the primary shaft 15, and an oil chamber 24 is formed inside the primary cylinder 23. On the other hand, in order to change the groove width of the secondary pulley 18, a secondary cylinder 25 is provided on the secondary shaft 16, and an oil chamber 26 is formed inside the secondary cylinder 26. The groove widths are set by regulating a primary pressure Pp introduced into the primary-side oil chamber 24 and a secondary pressure Ps introduced into the secondary-side oil chamber 26.

Figure 2:
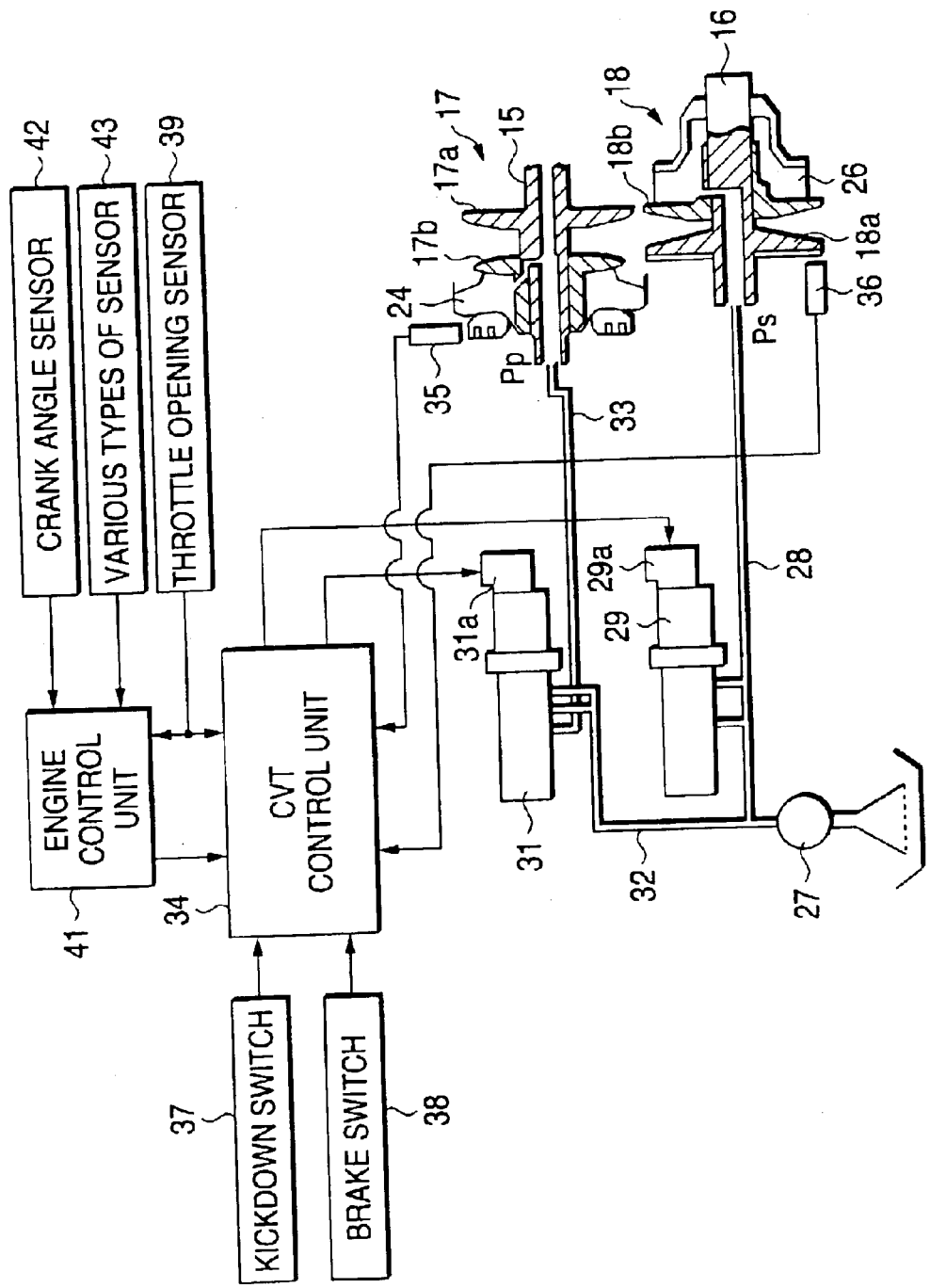
FIG. 2 is the schematic diagram showing a control system for controlling an operation thereof.

FIG. 2 is a schematic diagram showing a control system for controlling the operation of the continuously variable transmission 10. As shown in FIG. 2, a hydraulic fluid is supplied to the respective oil chambers 24, 26 from an oil pump 27 which is driven by the engine or an electric motor. A secondary pressure passage 28 connected to an outlet of the oil pump 27 communicates with the oil chamber 26 and is also connected to a secondary pressure port of a secondary pressure regulating valve 29. A secondary pressure Ps that is supplied to the oil chamber 26 is regulated by the pressure regulating valve 29 to a pressure for imparting to the belt 19 a clamping force required for a torque transmission.

The secondary pressure passage 28 connects to a secondary pressure port of a primary pressure regulating valve 31 via an oil communication passage 32, and a primary pressure port of the primary pressure regulating valve 31 connects to the oil chamber 24 via primary pressure passage 33. A primary pressure Pp is regulated to a value corresponding to a target speed ratio or a target vehicle speed by the primary pressure regulating valve 31, whereby the groove width of the primary pulley 17 varies to control the speed ratio. The secondary pressure regulating valve 29 and the primary pressure regulating valve 31 are both a proportional solenoid valve, and the secondary pressure Ps and the primary pressure Pp are regulated by controlling an electric current value supplied from a CVT control unit 34 to solenoid coils 29a, 31a of the respective valves.

Signals from a primary rotating speed sensor 35 for detecting the rotating speed of the primary pulley 17 and a secondary rotating speed sensor 36 for detecting the rotating speed of the secondary pulley 18 are inputted into the CVT control unit 34. Furthermore, a kickdown switch 37 mounted on a lower portion of an accelerator pedal and adapted to be switched on in an area where the accelerator pedal is widely opened, a brake switch 38 adapted to be switched on when a brake pedal is depressed, and a throttle opening sensor for detecting an opening degree of a throttle valve are connected to the CVT control unit 34.

An engine control unit 41, to which signals from a crank angle sensor 42 and signals from other various sensors 43 are sent, is connected to the CVT control unit 34. Engine speed data calculated based on the signals from the crank angle sensor 42 and various types of calculated data based on the signals from the various types of sensors 43 are inputted into the CVT control unit 34. Oil pressures supplied to the respective oil chambers 24, 26 are regulated by control signals sent from the control unit 34 to the respective solenoid coils 29a, 31a. The CVT control unit 34 and the engine control unit 41 have a microprocessor CPU for arithmetically processing the control signals, a control program, operational equations and ROM in which map data is stored and a RAM in which data is temporarily stored.

Figure 3:
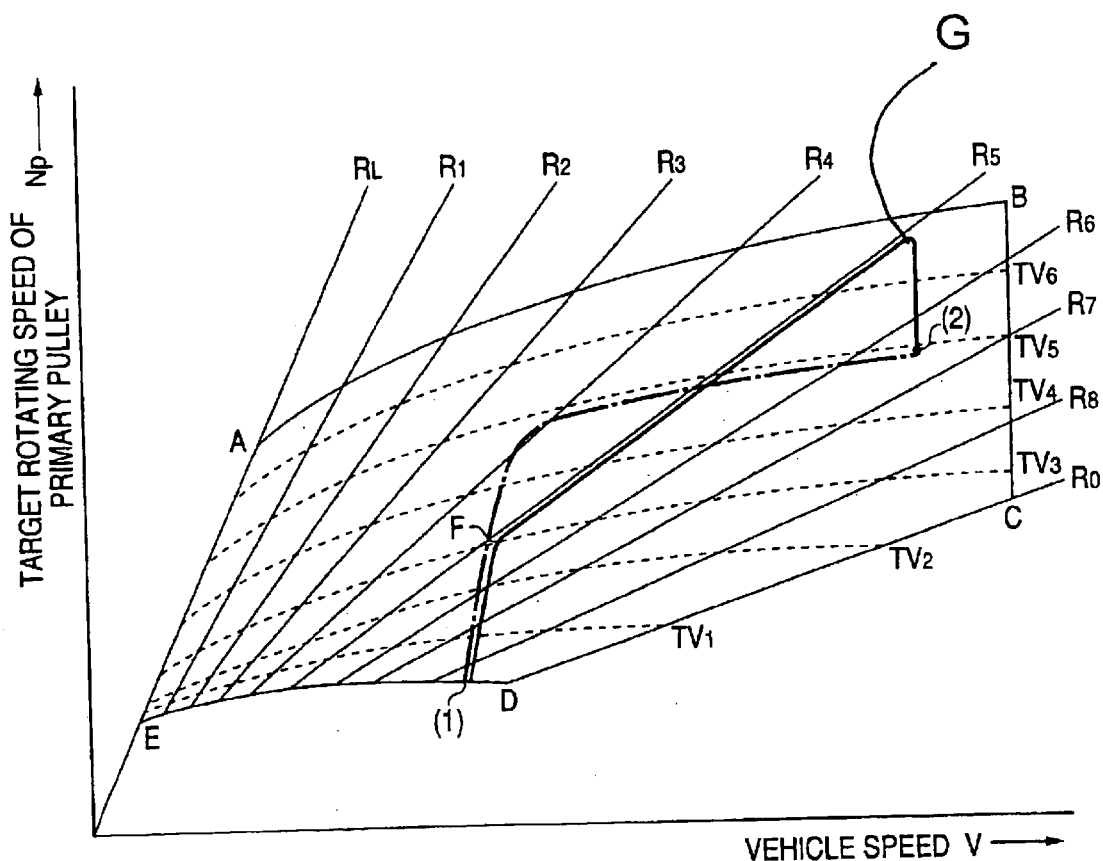
FIG. 3 is a chart showing shift control characteristics illustrating relationships between a target speed Np of a primary pulley and a vehicle speed V.

FIG. 3 is a diagram showing shift control characteristics showing a relationship between a target rotating speed Np of the primary pulley 17 in the continuously variable transmission shown in FIGS. 1 and 2 and a vehicle speed V. For example, when the accelerator pedal is fully depressed to accelerate the vehicle the target rotating speed of the primary pulley 17 reaches a point A with a low RL position held where a maximum speed ratio is attained, and thereafter, the speed ratio "i" is shifted to an overdrive Ro side where a minimum speed ratio is attained and while the rotating speed is slightly increased, the vehicle speed is increased to reach a fastest point B. In case the accelerator pedal is eased or a braking is applied from this condition, the vehicle speed is lowered to passing through points C, D with the speed ratio being held on the overdrive Ro side, and the speed ratio is shifted from the overdrive to the low side while following a lowest shift line and the vehicle speed reaches point E, then the vehicle being allowed to stop by the application of the braking with the speed ratio remaining at a low value. In an actual running, the speed ratio is freely set within a range denoted by reference numerals A to E between a low speed ratio RL and an overdrive speed ratio Ro.

In FIG. 3, a plurality of shift lines TV1 to TV6 illustrated by broken lines between a highest shift line extending between points A and B and the lowest shift line extending between points D and E are shift characteristic curves corresponding to a basic shift mode, each representing a relationship between the vehicle speed V and a target speed of the primary pulley 17 which each corresponds to a predetermined throttle opening. Map data corresponding to a basic shift mode is stored in a memory such as the RAM in the CVT control unit 34 and constitutes a basic shift mode setting unit.

Consequently, in a case where a shift control at the time of a rapid acceleration is effected based on the basic shift mode shown by the broken lines, for example, in case the driver depresses the accelerator pedal largely to a position corresponding to a throttle opening ② when the vehicle is running with the throttle opening TVO being in an opening condition ①, the shift control is implemented such that the engine speed Ne increases, the rotation of the primary pulley 17 increases as shown by a chained line. The speed ratio increases to the low side and thereafter the speed ratio decreases gradually so as to follow the shift characteristics shown by the broken lines.

In contrast, a plurality of shift lines R1 to R8 illustrated by the lines between the low speed ratio RL extending between points E and A and the overdrive speed ratio Ro extending between points C and D in FIG. 3 are shift characteristics curves corresponding to an accelerating shift mode and represent the relationships between the target rotating speeds of the primary pulley 17 and the vehicle speeds V. Thus, the continuously variable transmission according to the present invention has the accelerating shift mode illustrated by thin lines as well as the basic shift mode illustrated by the broken lines. Map data corresponding to the accelerating shift mode is stored in a memory such as the RAM in the CVT control unit 34 and constitutes an accelerating shift mode, whereby the speed ratio setting is carried out such that the vehicle speed is increased in line with an increase in engine speed in the accelerating shift mode.

Consequently, for example, in case the driver depresses the accelerator pedal largely to the position corresponding to the throttle opening ② when the vehicle is running with the throttle valve opening being in the opening condition ①, the shift control is performed such that first as shown by a thick solid line the engine speed increases with the increase in the target rotating speed Np of the primary pulley 17, and a speed ratio is set which is larger than the speed ratio corresponding to the opening ②. When the target speed Np reaches a predetermined speed indicated by reference numeral F the speed is made to change moderately, while the engine speed is increased, the speed ratio is allowed to converge to the target speed in the accelerating shift mode.

Thus, when an acceleration is effected, as shown by the broken lines in FIG. 3, the vehicle speed increases so as to go beyond the throttle opening lines and the characteristics curves indicated by the thin lines R1 to R8 are set for throttle openings, respectively. Then, as indicated by reference numeral G, the engine speed is lowered to effect switching to the shift characteristic of the base shift mode corresponding to the throttle opening ② at a point in time when the increase in the vehicle speed stops, and a smaller speed ratio is set.

Thus, the continuously variable transmission according to the present invention has the basic shift mode and the accelerating shift mode and controls the engine speed and the speed ratio based on the map data corresponding to the basic shift mode when the accelerator pedal depressed amount is small or when it is determined that the driver has no intention of accelerating the vehicle. The continuously variable transmission controls such that the engine speed increases and a larger speed ratio is set when it is determined that a rapid acceleration is demanded from the accelerator pedal depressed amount, whereby the vehicle speed is increased in line with the increase in the engine speed. This can improve the acceleration feeling of the vehicle.

In the aforementioned case, as shown in FIG. 3, for example, when the vehicle is running with the vehicle speed V and the target running speed Np being in the condition indicated by reference numeral ①, the target speed Np is increased to point F, and when an acceleration is completed, the target speed Np is lowered from point G to ②. However, the target speed may be changed according to running conditions obtained by the throttle opening TVO, the vehicle speed V when the acceleration starts and ends, respectively, as transitional targets.

Figure 4A:
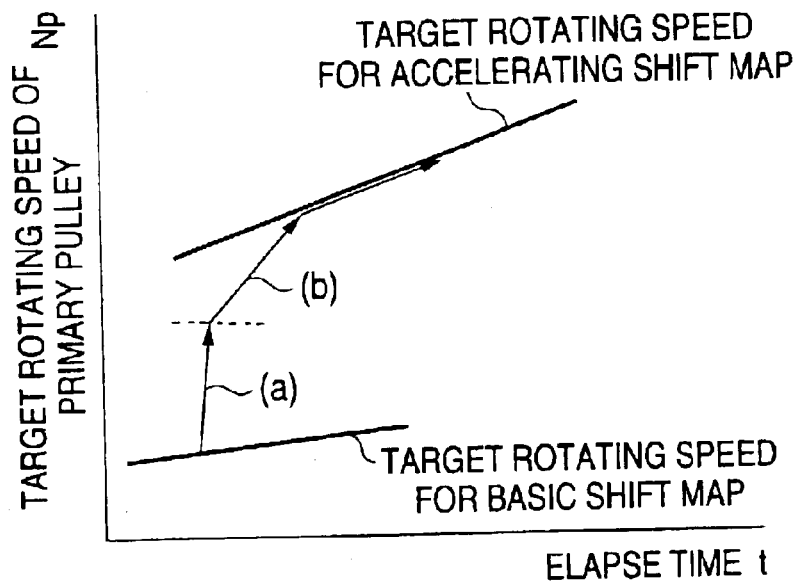
FIG. 4A is a time chart showing a transition control effected at the time of an initiation of an acceleration which requires a shift mode to be switched from a basic shift mode to an accelerating shift mode when a rapid acceleration is demanded by depressing an accelerator pedal largely.
Figure 4B:
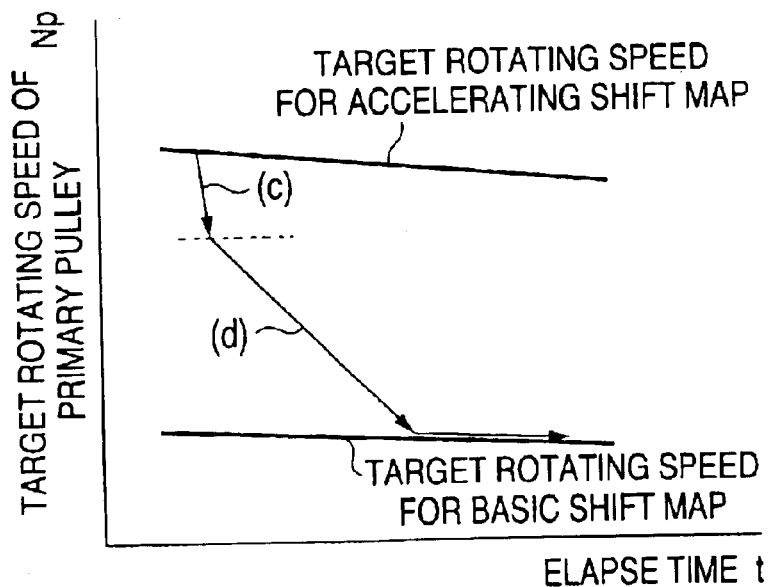
FIG. 4B is a time chart showing a transition control effected at a time of a completion of the acceleration which requires the shift mode to be shifted from the accelerating shift mode to the basic shift mode when the acceleration is completed.

FIG. 4A is a time chart showing a transition control effected at the time of an initiation of the acceleration which requires the shift mode to be switched from the basic shift mode to the accelerating shift mode when a rapid acceleration is demanded by depressing the acceleration pedal largely. FIG. 4B is the time chart showing the transition control effected at the time of a completion of the acceleration which requires the shift mode to be shifted from the accelerating shift mode to the basic shift mode when the acceleration is completed.

As shown in FIG. 4A, in case the rapid acceleration is required while the vehicle is running in the basic shift mode, as indicated by a reference numeral (a), the engine speed is increased in a moment until the target speed Np reaches the predetermined value. Next, when the predetermined target speed is reached, as shown by reference numeral (b), the target speed Np is increased moderately until the target speed Np converges to a target speed obtained by the accelerating shift map. In order to permit a moderate increase in the target rotating speed Np, the rotation increment per unit time or a rotation increment per a speed ratio, or the degree of an ascent or increase is restricted to control the engine speed. Thus, after the target speed Np has reached to the target speed obtained by the accelerating shift map, a speed ratio set by the accelerating shift map is followed, and the vehicle speed is increased in line with the increase in the engine speed.

On the contrary, as shown in FIG. 4B, when the acceleration is completed while the vehicle is running in the accelerating shift mode, as indicated by the reference numeral (c), the engine speed is lowered in one moment until the target speed Np reaches the predetermined value. Next, when the predetermined target speed is reached, as indicated by the reference numeral (d), the target speed Np is lowered moderately until the target speed Np converges to the target speed obtained by the basic shift map. In order to permit a moderate decrease in the rotating speed, the rotation decrement per a unit time or a rotation decrement per a speed ratio, or the degree of the descending or the decrease is restricted and the engine speed is controlled such that an optimum engine brake can be obtained. Thus, after the acceleration is completed, the shift control is switched from the shift control based on the accelerating shift map to the shift control based on the basic shift map. Parameters as indicated by the reference numerals (a) to (d) in FIG. 4 are stored in the memory as the map data, respectively and constitute a transitional control unit.

The transitional controls shown in FIG. 4 may not be carried out when either one of the engine speed and the vehicle speed at the time of the initiation of the acceleration is equal to or larger than the predetermined value, or when the engine speed is low or the vehicle speed is low.

Figure 5:
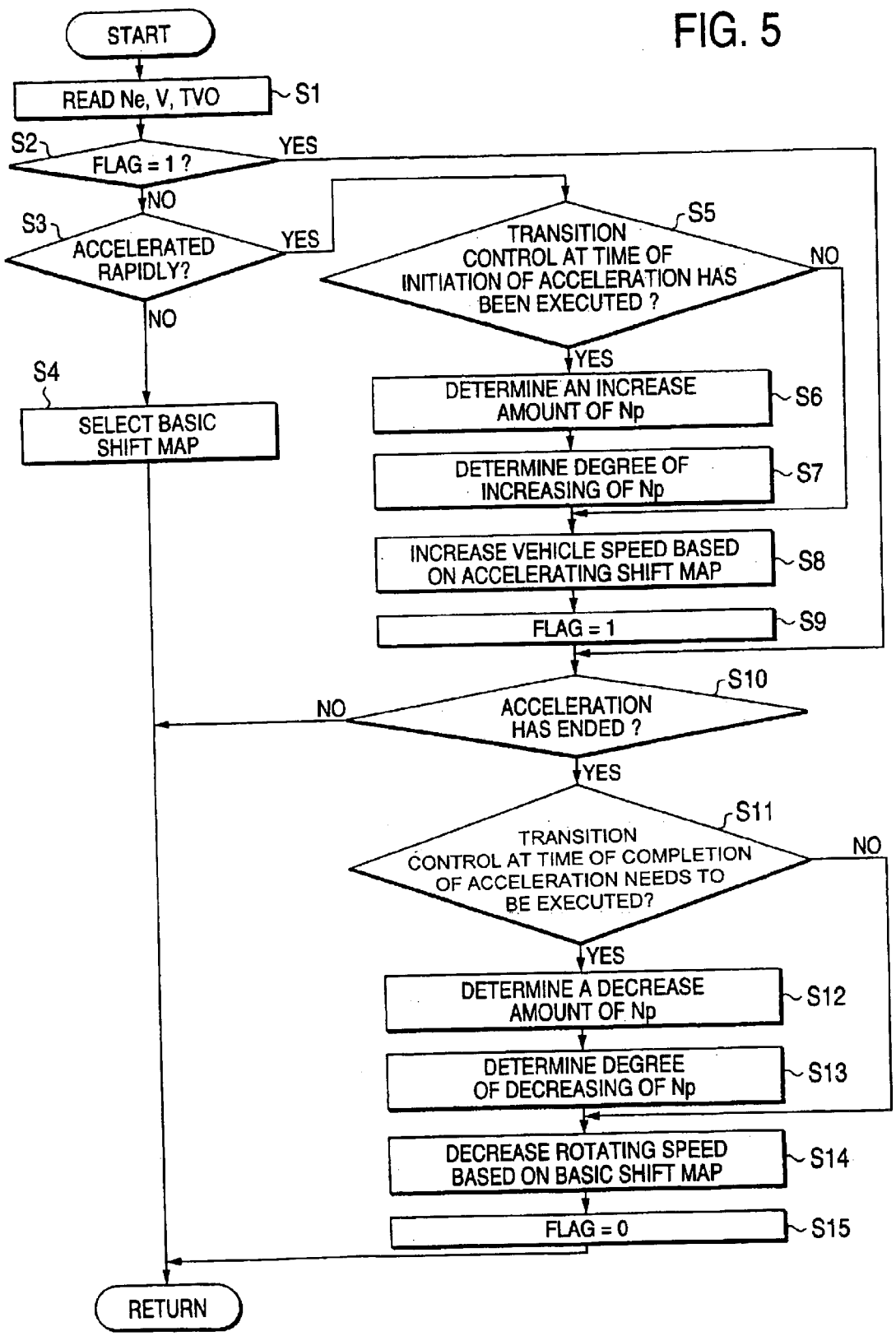
FIG. 5 is a flowchart showing a shift control routine for the continuously variable transmission according to the present invention.

FIG. 5 is a flowchart showing a shift control routine for the continuously variable transmission according to the present invention, and in step S1, values for the engine speed Ne, the current vehicle speed V and the throttle opening TVO are read in order to detect the running conditions of the vehicle. In step S2, in case it is determined that a flag is not set, in step 3, whether or not the driver demands a rapid acceleration or a kickdown is determined. This is determined by the kickdown switch 37. However, this determination may be implemented by determining whether the depressed amount of the accelerator pedal is equal to or larger than the predetermined value by taking in signals from the throttle opening sensor 39 and an accelerator pedal sensor. As this occurs, the demand of the rapid acceleration is determined also by taking into consideration a case where the depressed amount per unit time reaches or exceeds the predetermined value (dL/dt≧predetermined value).

In case it is determined that no rapid acceleration is demanded, step S4 is executed and the basic shift mode is selected and exists of the routine, whereby the shift control based on the basic shift map is implemented. On the other hand, in step S3, in case it is determined that the rapid acceleration is demanded, in step S5, whether or not the transition control at the time of the initiation of acceleration is implemented is determined. In case the transition control is determined to be effected, in step S6, an increase amount for the target rotating speed Np of the primary pulley 17 is determined, and in step S7, a variation or the degree of the increase of the target speed Np per unit time is determined.

In order to determine the increase amount of the target speed Np, a target speed Np increase amount map based on the vehicle speed V and the throttle opening TVO is referenced. In order to determine the degree of the increase in target speed Np, referenced is a vehicle speed V and target speed Np variation increase limiting map. As the degree of the increase in the target speed Np, the variation of the speed ratio or the speed per unit time is set, for example, at in an order of +200 rpm/s.

Next, in step S8, the accelerating shift map is referenced to determine an optimum shift line, and the vehicle speed is increased, whereby, as indicated by reference numerals F to G in FIG. 3, the vehicle is sped up such that the vehicle speed increases in line with the increase in the engine speed. In case this follow-up acceleration is implemented, in step S9, the flag is set, and by so setting the flag, the acceleration with the speed ratio based on the accelerating shift map continues to be effected until the acceleration ends.

On the other hand, in step S10, in case the acceleration is determined to be completed, in step S11, it is determined whether or not the transition control at the time of the completion of the acceleration is implemented. The determination of the completion of acceleration is made by determining whether the kickdown switch 37 is switched off or the throttle opening reaches or goes below the predetermined value. However, this determination may be made by determining whether an easing speed of the accelerator pedal is equal to or smaller than the predetermined value by taking in signals from the throttle opening sensor 39 or the accelerator pedal sensor. As this occurs, the eased amount per unit time is compared with a predetermined value for determination (dL/dt<predetermined value).

In step S11, in case the transition control is determined to be effected, then, in step S12, a decrease or reduction amount of the target rotating speed Np of the primary pulley 17 is determined, and in step S13, the degree of the decrease in the target speed Np is determined. In order to determine a decrease amount of the target speed Np, a target speed Np decrease amount map based on the vehicle speed V and the throttle opening is referenced. In order to determine the degree of the decrease in the target speed Np, the vehicle speed V and the target speed Np variation decrease limiting map is referenced. As the degree of decrease in the target speed, the variation in the speed ratio or the speed per unit time is set at in the order of −200 rpm/s.

Next, in step S14, the engine speed is lowered while referencing the basic shift map such that the target speed converges to an optimum shift line, whereby, as indicated by reference numerals from G to ② in FIG. 3, the target speed Np varies. Thus, when the shift mode is switched to the basic shift mode, in step S15, the flag is restored.

Thus, in the case where the rapid acceleration is demanded according to the depressed amount of the accelerator pedal, since the shift control is switched from the control by the normal basic shift map to the control by the accelerating shift map, the vehicle speed is allowed to increase in line with the increase in the engine speed. In case the acceleration is determined to be completed, the shift control is switched from the control by the accelerating shift map to the control by the basic shift map, whereby the acceleration feeling can be improved.

When the shift control is switched from the control by the basic shift map to the control by the accelerating shift map, and when the shift control is switched from the control by the accelerating shift map to the control by the basic shift map, switching to respective running modes can be effected smoothly, whereby the shift feeling can be improved. In particular, by a provision of the accelerating shift map as well as the basic shift map, the engine speed while the vehicle is running based on the basic shift map can be set as low as possible, whereby the improvement in the fuel consumption can be attained.

While the acceleration characteristics for setting the accelerating shift mode are indicated by the reference numerals R1 to R8 in FIG. 3, the number of the characteristics curves can be set optionally. Similarly, also as to the basic shift mode for setting the target speed Np in accordance with throttle opening, the number of the characteristics curves TV1 to TV6 can be set optionally.

The present invention is not limited the embodiment but can be modified variously without departing from the spirit and scope of the present invention. For example, while the continuously variable transmission is shown in FIG. 1, the present invention may be applied to a toroidal continuously variable transmission in which a power roller is disposed between an input side disk which is the input side rotating element and an output side disk which is the output side member as a power transmission element.

According to the present invention, since the speed ratio of the continuously variable transmission is held constant or substantially constant when the vehicle is rapidly accelerated, the vehicle speed increases with the increase in the engine speed, thereby making it possible to improve the acceleration feeling. In addition, when the accelerating condition ends, since the normal running condition is restored by smoothly switching back from the acceleration mode to the basic shift mode, the fuel consumption can be improved. In addition, since the engine speed can be set low while the vehicle runs in the basic shift mode, the fuel consumption can be improved.

The disclosure of Japanese Patent Application No. 2002-053109 filed on Feb. 28, 2002 including the specification, the drawings and the abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A shift controlling apparatus for a continuously variable transmission for changing a rotation of an input side rotational element driven by an engine via a power transmission element to an output side rotational element, comprising;

a rapid acceleration determination unit for determining whether or not a rapid acceleration demanding condition exists according to a depressed amount of an accelerator pedal;

a basic shift mode setting unit for setting a rotating speed of the input side rotational element based on a basic shift mode according to operating conditions, an accelerating shift mode setting unit for increasing the vehicle speed based on an accelerating shift mode correspondingly to an increase in an engine speed, wherein a target rotating speed of the input side rotational element corresponding to a throttle opening degree in the accelerating shift mode is larger than the target rotating speed in the basic shift mode, and is set according to the running conditions correspondingly to the increase in the engine speed, and a control unit for switching from the basic shift mode to the accelerating shift mode when the rapid acceleration determination unit determines that a rapid acceleration demanding condition is decided, wherein a transition control is implemented that the rotational speed of the input side rotational element is moderately increased, by restricting a degree of increase in the rotating speed to be lower than the degree of increase in the rotating speed in the basic shift mode, after the rotating speed of the input side rotational element is increased to a predetermined value according to the running conditions of a vehicle when switching from the basic shift mode to the accelerating shift mode.

2. The shift controlling apparatus for the continuously variable transmission as set forth in claim 1, wherein:

switching from the accelerating shift mode to the basic shift mode is implemented when the rapid acceleration determination unit determines that the rapid acceleration demand is cancelled.

3. The shift controlling apparatus for the continuously variable transmission as set forth in claim 2, further comprising:

a transition control is implemented that the rotating speed of the input side rotational element is moderately decreased by restricting the degree of decrease in the rotating speed after the rotating speed of the input side rotational element is decreased to a predetermined value according to the running conditions of the vehicle when switching from the accelerating shift mode to the basic shift mode.

4. The shift controlling apparatus for the continuously variable transmission as set forth in claim 1, wherein:

whether or not the transition control is performed is made according to the running conditions of the throttle opening degree and the vehicle speed, and the transition control is performed when at least either one of the rotating speed of the input side rotational element and the vehicle speed reaches or exceeds an predetermined value, whereas the transition control is unexecuted at the low engine and vehicle speeds.

5. The shift controlling apparatus for the continuously variable transmission as set forth in claim 1, wherein:

a target speed ratio in the accelerating shift mode is larger than a speed ratio corresponding to the throttle opening degree in the basic shift mode and the vehicle speed is increased beyond a throttle opening characteristics curve in the basic shift mode while following the engine speed.

6. The shift controlling apparatus for the continuously variable transmission as set forth in claim 1, wherein:

the basic shift mode has shift characteristics in which the target rotating speed of the input side rotational element relative to the vehicle speed is set with respect to each throttle opening degree, whereby the engine speed is set at a low value while running in the basic shift mode.

7. The shift controlling apparatus for the continuously variable transmission as set forth in claim 1, wherein the predetermined value is set according to the vehicle speed and the throttle opening degree.

8. The shift controlling apparatus for the continuously variable transmission as set forth in claim 1, wherein the degree of increase in the rotating speed during the transition control is restricted according to the vehicle speed and the target rotating speed.

9. A shift controlling method for a continuously variable transmission for changing a rotation of an input side rotational element driven by an engine via a power transmission element to an output side rotational element, comprising steps of;

determining whether or not a rapid acceleration demanding condition exists according to a depressed amount of an accelerator pedal;

setting a rotating speed of the input side rotational element based on a basic shift mode according to operating conditions;

increasing the vehicle speed based on an accelerating shift mode correspondingly to an increase in an engine speed, wherein a target rotating speed of the input side rotational element corresponding to a throttle opening degree in the accelerating shift mode is larger than the target rotating speed in the basic shift mode, and is set according to the running conditions correspondingly to the increase in the engine speed, switching from the basic shift mode to the accelerating shift mode when the rapid acceleration determining step determines that a rapid acceleration demanding condition is decided, and implementing that the rotational speed of the input side rotational element is moderately increased, by restricting the degree of increase in the rotating speed to be lower than the degree of increase in the rotating speed in the basic shift mode, after the rotating speed of the input side rotational element is increased to a predetermined value according to the running conditions of a vehicle when switching from the basic shift mode to the accelerating shift mode.

10. The shift controlling method for the continuously variable transmission as set forth in claim 9, wherein:

switching from the accelerating shift mode to the basic shift mode is implemented when the rapid acceleration determining step determines that the rapid acceleration demand is cancelled.

11. The shift controlling method for the continuously variable transmission as set forth in claim 10, further comprising step of:

implementing that the rotating speed of the input side rotational element is moderately decreased by restricting the degree of decrease in the rotating speed after the rotating speed of the input side rotational element is decreased to a predetermined value according to the running conditions of the vehicle when switching from the accelerating shift mode to the basic shift mode.

12. The shift controlling method for the continuously variable transmission as set forth in claim 9, wherein:

whether or not the implementing step is performed is made according to the running conditions of the throttle opening degree and the vehicle speed, and the implementing step is performed when at least either one of the rotating speed of the input side rotational element and the vehicle speed reaches or exceeds a predetermined value, whereas the implementing step is unexecuted at the low engine and vehicle speeds.

13. The shift controlling method for the continuously variable transmission as set forth in claim 9, wherein:

a target speed ratio in the accelerating shift mode is larger than a speed ratio corresponding to the throttle opening degree in the basic shift mode and the vehicle speed is increased beyond a throttle opening characteristics curve in the basic shift mode while following the engine speed.

14. The shift controlling method for the continuously variable transmission as set forth in claim 9, wherein:

the basic shift mode has shift characteristics in which the target rotating speed of the input side rotational element relative to the vehicle speed is set with respect to each throttle opening degree, whereby the engine speed is set at a low value while running in the basic shift mode.

15. The shift controlling method for the continuously variable transmission as set forth in claim 9, wherein the predetermined value is set according to the vehicle speed and the throttle opening degree.

16. The shift controlling method for the continuously variable transmission as set forth in claim 9, wherein the degree of increase in the rotating speed during the transition control is restricted according to the vehicle speed and the target rotating speed.

* * * * *